Jan. 26, 1960   V. BONFIGLIO   2,922,193
PROCESS AND MACHINE FOR REPRODUCING LACE AND
PERFORATED ARTICLES WITH PLASTIC MATERIAL
Filed Dec. 5, 1956

INVENTOR
VINCENZO BONFIGLIO

BY *Greene, Pineles & Durr*

ATTORNEY

2,922,193

PROCESS AND MACHINE FOR REPRODUCING LACE AND PERFORATED ARTICLES WITH PLASTIC MATERIAL

Vincenzo Bonfiglio, Milan, Italy

Application December 5, 1956, Serial No. 626,480

Claims priority, application Italy September 5, 1956

2 Claims. (Cl. 18—47.5)

The present invention relates to a process for reproducing or imitating lace and perforated articles, such as table cloths, with plastic material.

To obtain such an imitation according to the invention, I first prepare a mold consisting of a layer of pasty material such as "Plastiline" on which is laid the lace to be reproduced, said layer being disposed on a plate or plane table.

Then the layer of "Plastiline" is removed from the regions corresponding to the perforations of the lace by means of a suitable utensil while in the remaining regions, a plurality of needles or suitable bars are pierced into the "Plastiline" practically normal to the plate. Then some cement is poured on the so prepared "Plastiline" layer to obtain a mold that reproduces in the negative the desired lace and presents furthermore a plurality of holes whereby it is possible to suction mold articles of plastic material on which the lace is reproduced.

The so obtained articles of plastic material presenting the desired design, are not perfect yet as their back presents some unevennesses, roughnesses or air bubbles corresponding to the holes provided in the negative model of the reproduced lace.

These unevennesses are eliminated by passing the printed sheet of plastic material through a suitable splitting means which splits off the lower part covered with bubbles and unevennesses.

It is necessary to cool the printed articles representing the lace by means of any convenient process, i.e. in a refrigerator before splitting off the lower portion so as to give them the rigidity necessary to withstand the splitting step without undergoing any deformation.

The process will be described more fully with reference to the attached drawings, which represent in:

Figs. 1–3 the different phases of the process for obtaining the mold in cement or other suitable material and namely:

Figure 1:
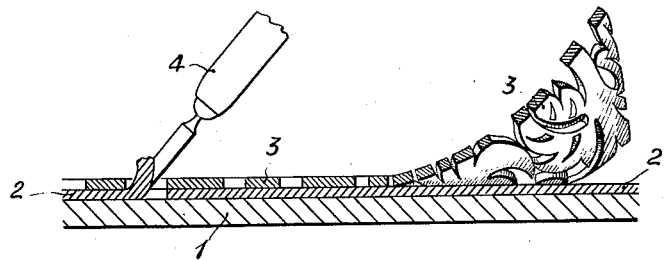
Fig. 1 shows the paste material layer on which the lace is disposed.
Figure 2:
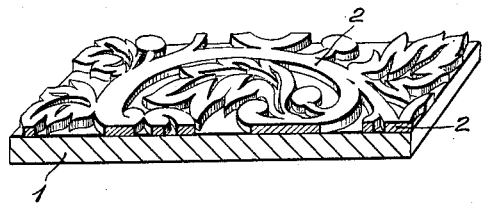
Fig. 2 is a view of the paste material layer in which some portions corresponding to the perforations of the lace have been removed.
Figure 3:
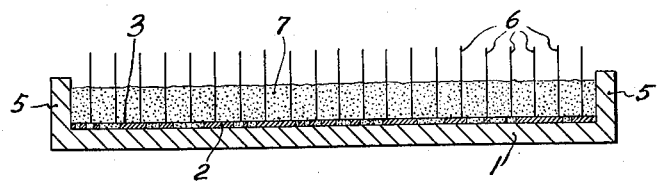
Fig. 3 shows a section of the frame with the "Plastiline" layer and on which the cement has already been poured to form the negative mold.

As shown in Fig. 1, a thin layer 2 of "Plastiline" is spread on any convenient plane surface 1 and a table cloth or similar lace article 3 which is to be reproduced is placed over layer 2. Then the portions corresponding to the lace-holes are removed from the layer 2 by means of a burin 4 or a similar utensil, so that the layer 2 reproduces completely the lace to be imitated in plastic material. A portion of said layer 2 with the lace 3 removed therefrom is illustrated in Fig. 2.

The function of the layer 2 is to raise the level of the lace 3 further above the plane 1 so that local indentations deeper than those present in the lace 3 are provided.

Having so obtained the perfect imitation of the lace with layer 2, the latter is formed into mold 5; thereafter a plurality of needles 6 are inserted normal to the plane of 1 whereupon the cement 7 is cast into the mold 5. The cement snugly penetrates into the opening of the layer 2 on which the lace 3 to be reproduced is still lying. In this way a cement mold is obtained which, on its lower surface, represents exactly, in the negative, the lace which is to be imitated with the plastic material in the positive.

Upon hardening of the cement and removal of the needles, a pierced mold is obtained which is suitable for the molding of the plastic material by a suction process, for which purpose any convenient device can be used.

The articles in plastic material coming out of the molding machine still present a drawback, namely, the molded laces present on their backside projections or bubbles corresponding to the indentations made in the mold. To eliminate this inconvenience said laces have to be split to remove the back layer as it is diagrammatically illustrated in Fig. 4.

Figure 4:
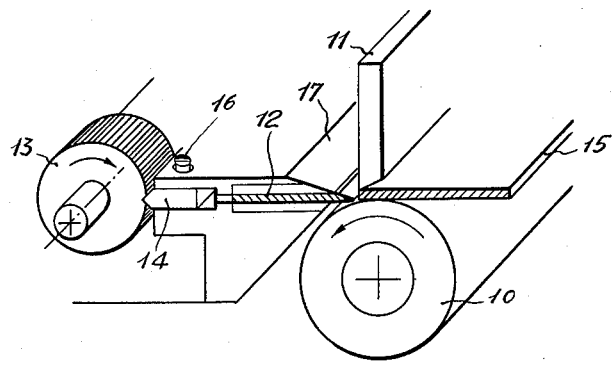
Fig. 4 shows a device suitable for carrying out the splitting step.

The device of Fig. 4, per se, is not part of the present invention but illustrates how the splitting step is carried out. The molded sheet 15 is fed between roller 10 and guide 11 against the blade 12, the reproduced lace portion of the sheet 15 is fed upwardly over inclined plane 17 and the excess portion passes downwardly below blade 12. Adjusting devices 13, 14 and 16 for blade 12 are also shown in Fig. 4.

To ensure the proper feeding of the article 15, as this last consists of very smooth material and is arranged with its back and therefore smoothest side facing the roller 10, it is necessary to cover said roller 10 with emery paper to facilitate the advancement of the layer 15. This last is also conveniently covered with emery paper, said emery paper advancing together with the plastic material. Upon passage of the plastic material through the splitting machine, its excess portion to be eliminated, is guided downwardly while the finished article of plastic material is pushed upwardly on an inclined plane 17 and is later transferred to the packing station.

The sheet of coarse grain emery paper which is arranged to advance together with the pressed article has the double aim of facilitating the entrance under the guide member 11 and of preventing the swift movement of the blade necessary for the cut and normal to the direction of advancement of the sheet from dragging with it the sheet itself and causing so curling and shuffling of the same and consequently cuts in undesired positions.

Of course the splitting machine has been described by way of example only and this last as well as the details of the molding process of the plastic sheet can vary according to requirements without departing from the scope of the present invention.

What I claim is:

1. In a process for reproducing the design of lace articles on plastic materials the steps comprising, positioning the lace article to be reproduced in contact with a layer of pasty material, removing those portions of the pasty material which correspond to the interstices of the lace to provide a composite lace design which is thicker than the thickness of said lace article, inserting a multiplicity of needle-like rods at spaced points into said composite design, said needles being inserted substantially normal to the plane of the design, applying molding material to said design and surrounding a portion of said needle-like rods, removing said lace design and the needle-like rods from said molding material to provide a negative mold of openings adapted for suction molding of plastic material, suction molding plastic material on said negative mold and thereafter splitting the molded article to eliminate the bottom portion of the latter.

2. In the process as claimed in claim 1, the step of refrigerating the molded article to stiffen the same prior to splitting it.

References Cited in the file of this patent
UNITED STATES PATENTS

| | | |
|---|---|---|
| 1,724,208 | Lewis | Aug. 13, 1929 |
| 1,923,524 | Young et al. | Aug. 23, 1933 |
| 2,022,587 | Cunningham | Nov. 26, 1935 |
| 2,244,565 | Nast | June 3, 1941 |
| 2,460,242 | Renaud | Jan. 25, 1949 |
| 2,708,773 | Bacon | May 24, 1955 |
| 2,780,284 | Wisti | Feb. 5, 1957 |
| 2,781,549 | Milne | Feb. 19, 1957 |
| 2,784,455 | Pulaski | Mar. 12, 1957 |